Patented Feb. 5, 1952

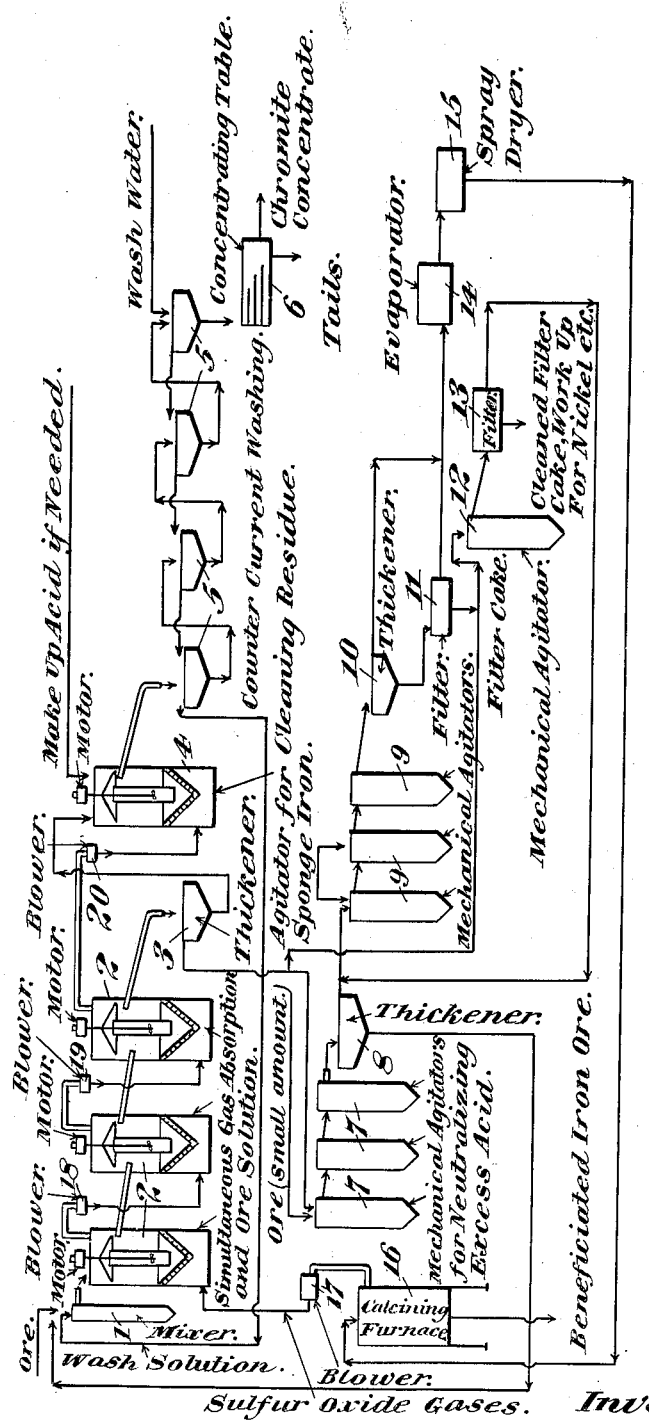

2,584,700

UNITED STATES PATENT OFFICE 2,584,700

TREATMENT OF IRON ORE CONTAINING IMPURITIES, INCLUDING NICKEL AND CHROMIUM

Carle R. Hayward, Quincy, Mass., assignor to Bethlehem Steel Company, a corporation of Pennsylvania Application August 24, 1948, Serial No. 45,862

10 Claims. (Cl. 23—200)

This invention is directed to a process for removing chromium from solutions containing iron and chromium. More specifically, this invention relates to a process of treating iron ore to recover iron in a form suitable for further processing. The invention is particularly directed to a treatment for the elimination of impurities, such as compounds of aluminum, silicon, chromium, nickel and cobalt from iron ores of the type which contain nickel in excess of 0.25%, and chromium in excess of 0.5%, such as, for example, those ores found in Cuba known as Mayari ores. Such ores may be classified as iron ores of the nickeliferous, lateritic, silicate type.

The principal object of this invention is to prepare from iron ores, by the removal of deleterious impurities, an iron bearing product suitable for smelting.

Another object is the recovery of metal values, other than iron, which have been removed from iron ore during beneficiation.

Raw, or unrefined, iron ores of the Mayari type contain impurities such as alumina, silica, and mixed oxides of chromium, and of nickel and cobalt, in amounts which render these ores unsuitable for use in the preparation of ordinary carbon steels.

I have discovered a process of treating a Mayari ore of fine particle size, whereby ore is leached with sulfuric acid and the resultant slurry settled to remove chromium and a substantial amount of silica. The solution, containing iron, nickel, cobalt, manganese, aluminum and some of the chromium as sulfates, is decanted and treated with metallic iron, as for example iron powder, to precipitate nickel, cobalt, aluminum and chromium. After removing the precipitate, the remaining solution, containing the iron, is evaporated to dryness, and the residue roasted to produce iron oxide of a high purity. A modification of my invention is the recovery of sulfur oxide gas, i. e., sulfur trioxide and/or sulfur dioxide, obtained from roasting iron sulfate, and the return of these gases to the leaching operation to replenish the leaching solution. The sulfur oxide gases may be used for leaching by dissolving them in either sulfuric acid, or in water.

The steps of my invention are shown in the accompanying diagrammatic flow chart, and the following detailed description discloses one mode of procedure by which the invention can be performed.

While the amount of impurities in an iron ore of the type commonly known as Mayari will vary over a considerably wide range, a sample of raw ore in which the impurities analyzed, Ni–1.55%, Cr–2.48, Co–0.11, Mn–1.09, $SiO_2$–7.5, and $Al_2O_3$–8.5, can be considered as representative of the type of ores which can be effectively treated by my process. The above analysis was made on a calcined basis, the iron in the ore analyzing Fe–54.0%.

Referring now to the flow chart, ore and sulfuric acid are introduced into a mixer 1, and the resultant slurry is then transferred to a series of tanks 2 in which sulfuric acid is capable of simultaneous gas absorption and dissolution of ore. This leaching operation is performed at a temperature preferably above 150° F. The acid present in the tanks 2 is supplemented by continuously dissolving waste sulfur oxide gas in the acid. Waste gas is obtained from a roasting operation as will be explained later. The slurry formed in leaching is transferred to a thickener 3 and the resultant coagulated solids withdrawn to an agitating tank 4 where the residue is further treated with acid to ensure the complete removal of soluble material. After this cleaning step, the solids and wash liquor, from tank 4, are sent through a four-stage washing operation, performed in a series of tanks 5, where the residue is washed counter-currently, the residue finally being deposited on a concentrating table 6, where chromium, in the form of chromite, is separated from silica. The supernatant liquor from the thickener 3 is flowed to a series of agitator tanks 7, where the liquor, which contains iron, nickel, cobalt, manganese, aluminum and some chromium salts in solution, along with excess sulfuric acid, is treated with a small amount of raw ore to lower the amount of free acid. The newly formed slurry, which contains only a small amount of solid matter, is sent to a thickener 8 and the settled solids re-circulated to the original leaching operation. The solution overflowing the thickener 8 is introduced into a further series of agitators 9. At this point the solution has practically the same chemical analysis as that from the first thickener step, except for a reduction in the amount of free acid. Sponge iron is now added to the solution to precipitate nickel, cobalt, chromium and aluminum. Iron addition must be made in an amount somewhat in excess of the quantity required to neutralize sulfuric acid and to convert ferric sulfate to ferrous sulfate, as well as that required to precipitate the metal values. The slurry formed by the iron addition, and which now contains precipitated metal values and a solution of ferrous sulfate in very dilute sulfuric acid, is removed to a thickener 10 and then filtered in filter 11. The filter cake, from this first filtering operation, contains the precipitated metals, either in the metallic or combined form, as well as some excess sponge iron. In order to remove excess iron from the precipitate, the cake may be digested in an agitator 12 with a small amount of overflow liquor from the first thickener operation, and the resultant slurry re-filtered in filter 13. The filtrate from this last step is returned to the precipitation agitators 9. The filter cake from the second filtering operation contains nickel, cobalt, aluminum and chromium in a form from which they can be separated by conventional means. After the first filtration step, a filtrate remains which contains most of the iron as ferrous sulfate in very dilute sulfuric acid. This iron solution is sent to an evaporator 14, where the solution is evaporated to form iron sulfate crystals. The crystals, after being dried in a spray drier 15, are transferred to a calcining furnace 16, preferably of the rotary type. In the calcining operation, the metal sulfates are decomposed at a temperature above 1100° F. to form sulfur trioxide and sulfur dioxide gases, which gases may be returned to the leaching apparatus to be used in further ore digestion. The sulfur oxide gases are forced into the leaching apparatus 2 by means of blower 17, and are further forced through the subsequent stages of leaching by means of blowers 18, 19 and 20. The product remaining after roasting is a refined iron ore of high iron content (65.0% to 68.5%) with a minimum of impurities. Such roasted ore is suitable for smelting, or for other uses requiring an iron oxide low in impurities.

As previously pointed out, acid for the leaching operation may be supplied directly to the leaching tanks 2. To maintain a constant concentration of acid in the leaching tanks 2, additions of fresh acid may be made by introducing sulfur trioxide gas into the leach solution, or such gas may be introduced into a solution of sulfuric acid in an outside tank to form replenisher acid, which acid may be added to the leaching operation as needed. Sulfur trioxide and sulfur dioxide gases evolve as a waste product in the roasting of the metal sulfate in the calcination process, and the re-use of these waste gases for the purpose of leaching, especially in a continuous process, effects a considerable reduction in leaching costs. By controlling the temperature of the roasting operation to provide for selective decomposition of the sulfates, formation of sulfur trioxide can be enhanced. However, some sulfur dioxide will be evolved during calcining regardless of the temperatures used. Presence of some sulfur dioxide gas is not necessarily objectionable, for some of this gas will probably be oxidized to sulfur trioxide during the leaching step. If a large volume of sulfur dioxide gas is produced, and little or no oxidation takes place, this gas would have a reducing effect on the ferric iron in the ore, and considerable ferrous sulfate would thus be produced during leaching. Sulfuric acid of a concentration of approximately 5 normal has been found suitable for efficient leaching.

It should be explained, that in leaching an ore of the type under consideration, most of the chromium will remain as a solid in the slurry after leaching. The residual chromium, which is present as a mixed oxide of chromium and iron, can be recovered by concentrating, to separate it from the silica. Some of the chromium, present in the original ore, dissolves during the acid leach, and considerable of this chromium may be precipitated in the precipitating tanks 9 along with nickel, cobalt and aluminum. Chromium may also be precipitated by the addition of metallic iron to a solution containing chromium and iron sulfate, and in which nickel, cobalt and aluminum are absent.

The iron oxide obtained after roasting is of a degree of purity which makes it entirely satisfactory for use as a blast furnace charge. A typical analysis of a refined ore made by my process is given below:

|  | Per cent |
|---|---|
| Fe | 68.39 |
| Ni | 0.05 |
| Cr | 0.05 |
| Co | 0.018 |
| Mn | 0.33 |
| $SiO_2$ | 1.00 |
| $Al_2O_3$ | 2.00 |

While my process has been directed chiefly to the recovery of a satisfactory iron oxide product, collateral benefits are derived from the process through the separation and recovery of valuable chromium, nickel and cobalt.

I claim:

1. The method of treating an iron ore containing nickel in excess of 0.25 per cent and chromium in excess of 0.5 per cent which comprises leaching said ore with a water solution of a material of the group consisting of sulfuric acid, sulfur oxide gases, and mixtures thereof to form a slurry, settling said slurry and removing the supernatant liquor therefrom, adding metallic iron to said liquor to form a precipitate containing nickel and chromium values, separating said precipitate from the remaining liquor, evaporating said remaining liquor to produce an iron salt and then roasting said iron salt to obtain iron oxide.

2. The method of treating an iron ore containing nickel in excess of 0.25 per cent and chromium in excess of 0.5 per cent which comprises leaching said ore with sulfuric acid to form a slurry, settling said slurry and removing the supernatant liquor therefrom, adding metallic iron to said liquor to form a precipitate containing nickel and chromium values, separating said precipitate from the remaining liquor, evaporating said remaining liquor to produce an iron salt and then roasting said iron salt to obtain iron oxide.

3. The method of treating an iron ore containing nickel in excess of 0.25 per cent and chromium in excess of 0.5 per cent which comprises leaching said ore with a mixture of sulfuric acid and sulfur oxide gases to form a slurry, settling said slurry and removing the supernatant liquor therefrom, adding metallic iron to said liquor to form a precipitate containing nickel and chromium values, separating said precipitate from the remaining liquor, evaporating said remaining liquor to produce an iron salt and then roasting said iron salt to obtain iron oxide.

4. A method in accordance with claim 3, in which sulfur oxide gases generated during the roasting operation are recovered and used in the leaching operation.

5. The method of treating an iron ore containing nickel in excess of 0.25 per cent and chromium in excess of 0.5 per cent which comprises leaching said ore with sulfur oxide gases and water to form a slurry, settling said slurry and removing the supernatant liquor therefrom, adding metallic iron to said liquor to form a precipitate containing nickel and chromium values, separating said precipitate from the remaining liquor, evaporating said remaining liquor to produce an iron salt and then roasting said iron salt to obtain iron oxide.

6. The method of continuously treating an iron ore containing nickel in excess of 0.25 per cent and chromium in excess of 0.5 per cent which comprises leaching said ore with sulfuric acid and sulfur oxide gases to form a slurry, settling said slurry and removing the supernatant liquor therefrom, adding metallic iron to said liquor to form a precipitate comprising at least 80 per cent of the nickel and chromium values present in the slurry, separating said precipitate from the remaining liquor, evaporating said remaining liquor to produce an iron salt, roasting said iron salt to obtain iron oxide and then recovering sulfur oxide gases from the roasting operation and returning said gases to the leaching operation.

7. The method of separating chromium from iron in an iron sulfate solution containing a small amount of chromium which comprises adding metallic iron to said sulfate solution to form a precipitate containing chromium values, then separating the said precipitate from the remaining solution.

8. The method of separating nickel and chromium from iron in a sulfate solution containing ferric iron and small amounts of chromium and nickel which comprises adding metallic iron to said sulfate solution to form a precipitate containing chromium and nickel, then separating the said precipitate from the remaining solution.

9. The method of separating nickel and chromium from iron in a sulfate solution comprising free sulfuric acid, ferric sulfate and small amounts of nickel and chromium which comprises adding sufficient metallic iron to said sulfate solution to completely neutralize said free sulfuric acid and completely reduce said ferric sulfate to ferrous sulfate and finally to form a precipitate containing nickel and chromium, then separating the said precipitate from the remaining solution.

10. The method of separating chromium from iron in a sulfate solution formed by leaching a Mayari type ore with sulfuric acid which comprises adding metallic iron to said sulfate solution to form a precipitate containing chromium values, said chromium values comprising at least 80 per cent of the chromium originally present in solution, then separating the said precipitate from the remaining solution.

CARLE R. HAYWARD.

REFERENCES CITED

The following references are of record in the file of this patent:

UNITED STATES PATENTS

| Number | Name | Date |
| --- | --- | --- |
| 1,045,723 | McFetridge | Nov. 26, 1912 |
| 1,237,765 | Eustis | Aug. 21, 1917 |
| 1,403,237 | Eustis | Jan. 10, 1922 |
| 1,415,897 | Reed | May 16, 1922 |
| 1,489,347 | Davison | Apr. 8, 1924 |
| 1,592,307 | Lienhardt | July 13, 1926 |
| 1,843,779 | McWhorter | Feb. 2, 1932 |
| 2,036,015 | Broderick et al. | Mar. 31, 1936 |
| 2,065,547 | Arnold et al. | Dec. 29, 1936 |
| 2,416,216 | Rau et al. | Feb. 18, 1947 |

OTHER REFERENCES

Thorton "Titanium," Chemical Catalog Co., Inc., page 160 (1927), N. Y. C.